(12) United States Patent
Wu et al.

(10) Patent No.: US 7,829,631 B2
(45) Date of Patent: Nov. 9, 2010

(54) SELF-CROSSLINKABLE WATERBORNE COATING COMPOSITION

(75) Inventors: Shaobing Wu, Jamestown, NC (US);
Frank Bor-Her Chen, Greensboro, NC (US)

(73) Assignee: Valspar Sourcing, Inc., Minneapolis, MN (US)

( * ) Notice: Subject to any disclaimer, the term of this patent is extended or adjusted under 35 U.S.C. 154(b) by 1192 days.

(21) Appl. No.: 10/530,975

(22) PCT Filed: Sep. 18, 2003

(86) PCT No.: PCT/US03/29715

§ 371 (c)(1),
(2), (4) Date: Feb. 22, 2006

(87) PCT Pub. No.: WO2004/026918

PCT Pub. Date: Apr. 1, 2004

(65) Prior Publication Data

US 2006/0122330 A1 Jun. 8, 2006

Related U.S. Application Data

(60) Provisional application No. 60/411,644, filed on Sep. 18, 2002.

(51) Int. Cl.
*C08F 8/30* (2006.01)

(52) U.S. Cl. .................. 525/123; 525/127; 525/185; 525/452; 525/453; 525/455

(58) Field of Classification Search .................. 525/127
See application file for complete search history.

(56) References Cited

U.S. PATENT DOCUMENTS

| | | | |
|---|---|---|---|
| 4,066,591 A | 1/1978 | Scriven et al. | |
| 4,764,553 A * | 8/1988 | Mosbach et al. | 524/591 |
| 4,927,876 A | 5/1990 | Coogan et al. | |
| 4,978,708 A * | 12/1990 | Fowler et al. | 524/507 |
| 4,983,662 A | 1/1991 | Overbeek et al. | |
| 4,988,762 A | 1/1991 | Overbeek et al. | |
| 5,137,961 A | 8/1992 | Goos et al. | |
| 5,137,967 A | 8/1992 | Brown | |
| 5,147,926 A | 9/1992 | Meichsner et al. | |
| 5,221,581 A | 6/1993 | Palmer et al. | |
| 5,262,464 A | 11/1993 | Koevenig et al. | |
| 5,288,804 A | 2/1994 | Kim et al. | |
| 5,401,790 A | 3/1995 | Poole et al. | |
| 5,541,251 A * | 7/1996 | Bontinck et al. | 524/507 |
| 5,739,194 A | 4/1998 | Natesh et al. | |
| 5,916,960 A | 6/1999 | Lum et al. | |
| 6,022,925 A | 2/2000 | Tomko et al. | |
| 6,063,861 A * | 5/2000 | Irle et al. | 524/591 |
| 6,579,932 B1 * | 6/2003 | Schipper et al. | 524/501 |
| 2002/0103292 A1 | 8/2002 | Blum et al. | |

FOREIGN PATENT DOCUMENTS

| | | |
|---|---|---|
| EP | 0 309 113 | 3/1989 |
| EP | 0 551 568 A2 | 7/1993 |
| EP | 0 596 503 A1 | 5/1994 |
| EP | 0 648 794 A1 | 4/1995 |
| WO | WO/00/24837 * | 4/2000 |
| WO | WO 00/56826 | 9/2000 |
| WO | WO 00/56827 | 9/2000 |

OTHER PUBLICATIONS

Okamoto, Yoshihiro et al., "Urethane/acrylic composite polymer emulsions", Progress in Organic Coatings, 29, pp. 175-182, 1996.
Tennebroek, R., et al., "*New Polymer Synthesis for (self) Crosslinkable Urethanes and Urethane Acrylics*", 4th Nürnberg Congress, Creative Advances in Coatings Technology, paper 17, (month unavailable) 1997.
Eastman Chemical AAEM datasheet, "*Acetoacetoxyethyl Methacrylate (AAEM) Acetoacetyl Chemistry*", Publication N-319C, 12 pages, (Dec. 1999).
XP002356701 Derwent Publications Ltd., Abstract for JP 07-228829, Aug. 29, 1995, Asahi Chem Ind Co. Ltd.

* cited by examiner

*Primary Examiner*—Randy Gulakowski
*Assistant Examiner*—Kyle Baumstein
(74) *Attorney, Agent, or Firm*—IPLM Group, P. A.

(57) ABSTRACT

The present invention provides a crosslinkable waterborne coating composition useful for providing protective coating to wood and other substrates. The coating composition includes a vinyl addition latex polymer having a first crosslinkable functional group and a polyurethane dispersion having a second crosslinkable functional end group. The coating composition is preferably essentially formaldehyde free.

31 Claims, No Drawings

SELF-CROSSLINKABLE WATERBORNE COATING COMPOSITION

CROSS-REFERENCE TO RELATED APPLICATIONS

This application claims the benefit of PCT Application No. PCT/US03/29715 filed Sep. 18, 2003, entitled SELF-CROSSLINKABLE WATERBORNE COATING COMPOSITION, which in turn claims the benefit of U.S. provisional application Ser. No. 60/411,644, filed Sep. 18, 2002, entitled SELF-CROSSLINKABLE WATERBORNE COATING COMPOSITION, the disclosures of both of which are herein incorporated by reference.

BACKGROUND

Protective coatings are desired for substrates such as metals, wood, ceramics, paper products, and the like. These protective coatings provide resistance to staining, soiling, solvents, scratching, and scuffing of the coated substrate. The protective coatings, when pigmented, may also provide a desired color to the substrate.

Many protective coating compositions are solvent based. Solvent based coating compositions may present challenges in use and removal of the solvent components. For example, coating compositions with high volatile organic compound (VOC) content are becoming increasingly undesirable due to the solvents that have to be removed during the coating and curing process.

Polyurethane coating compositions are commonly used as protective coatings. For example, polyurethane coating compositions are used in wood and other coating applications. Other coating compositions, such as those containing amino formaldehyde resins, are also commonly used. The use of formaldehyde containing chemicals is increasingly being targeted for reduction or elimination. Consequently, the elimination or reduction of formaldehyde containing chemicals in these coating compositions without sacrificing performance presents a continuing challenge.

From the foregoing, it will be appreciated that what is needed in the art is an environmentally friendly, high performance coating composition that is substantially free of formaldehyde, and is easy to make and apply. Such coating compositions and methods for preparing and applying the same are disclosed and claimed herein.

DEFINITIONS

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term cycloaliphatic group means an alicyclic group, but specifically excludes an aromatic group. The term "aromatic group" or "aryl group" means a mono-, di-, or polynuclear aromatic hydrocarbon group. The term "heterocyclic group" means a closed ring hydrocarbon in which one or more of the atoms in the ring is an element other than carbon (e.g., nitrogen, oxygen, sulfur, etc.)

Substitution is anticipated on the organic groups used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

Unless otherwise stated, the term "polymer" includes homopolymers and copolymers.

The term "low temperature" refers to coalescing conditions at temperatures less than about 90° C.

As used herein, the term "vinyl addition latex polymer" is meant to include acrylate, methacrylate, and vinyl latex polymers and copolymers.

SUMMARY

In one embodiment, the present invention provides a composition that comprises a vinyl addition latex polymer having a first crosslinkable functional group, and a polyurethane dispersion that includes a second crosslinkable functional end group. The composition may include an optional crosslinker. The composition is preferably in the form of a waterborne coating composition wherein the first crosslinkable functional group of the vinyl addition latex polymer and the second crosslinkable functional end group of the polyurethane dispersion self-crosslink at low temperature upon coalescence.

In another embodiment, the present invention provides a substrate coated with the aforementioned composition.

In one exemplary embodiment, the present invention provides a coating composition that comprises: (i) about 10 to 90 weight percent of a vinyl addition latex polymer having a first crosslinkable functional group, wherein the polymer has an acid number of between about 10 to 60; (ii) about 10 to 90 weight percent of polyurethane dispersion having a second crosslinkable functional end group; and (iii) about 1 to 20 weight percent of a crosslinker. This exemplary coating composition is essentially formaldehyde free and is crosslinkable at low temperature upon coalescence.

DETAILED DESCRIPTION

The present invention provides a novel coating composition that may be used to provide protective coating to wood and other substrates. The coating composition may comprise a vinyl addition latex polymer [e.g., an acrylic latex polymer] that includes a first crosslinkable functional group, a polyurethane dispersion that includes a second crosslinkable functional end group, and an optional crosslinker. The coating composition is preferably waterborne and is crosslinkable at ambient or low temperatures (e.g., between about 15 and 90° C., and more preferably between about 20 and 70° C., most preferably between about 20 and 50° C.). Most preferably, the waterborne coating composition is essentially free of formaldehyde. The waterborne coating composition may optionally contain adjuvants, such as, cosolvents, coalescents, wetting agents, pigments, flow/leveling agents, viscosity controlling agents, pH controlling agents, slip resistant agents, mar resistant agents, UV stabilizers, biocides, and the like.

The coating composition of the present invention includes polymers having self-crosslinking functional groups. By self-crosslinking, it is meant that the polymer components of the coating composition undergo one or more crosslinking reactions during and/or after film formation. Several different crosslinking reactions may be used to achieve this feature. The crosslinking reaction may be "polymer-to-polymer" (i.e., a reaction between the two different polymers) and/or "polymer-to-additional crosslinker compound" (i.e., a reaction between one or both polymers and an optional crosslinker compound). For example, the vinyl addition latex polymer component may comprise a first crosslinkable functional group that enters into a chemical reaction with a second crosslinkable functional end group on the polyurethane dispersion component. Optionally, a functional group on the vinyl addition latex polymer component and/or the polyurethane dispersion component enters into a chemical reaction with a separate crosslinking compound. Preferably, a functional group on the vinyl addition latex polymer component enters into a chemical reaction with both a functional group on the polyurethane dispersion component and a separate crosslinking compound.

By "functional end group" is meant that the functional group or groups are primarily located at the ends of the molecular chain. As an example, the crosslinkable polyurethane polymer usable in the present invention has at least a functional group located at one or more ends of the polyurethane polymer.

In one embodiment, a first component (e.g., a vinyl addition latex polymer component) contains a first reactive functional group such as a carbonyl group. The carbonyl group (e.g., a diacetone acrylamide (DAAM) functional group) is available for crosslinking with a second reactive functional end group (e.g., a hydrazide group, hydrazine group or both) to form an azomethine linkage. Such reactions for chain-pendant functional groups are described generally, in U.S. Pat. No. 4,988,762, which is herein incorporated by reference. The second reactive functional end group may be (i) attached to a polyurethane polymer and/or (ii) part of an optional separate crosslinker compound (e.g., a dihydrazide compound). If desired, the aforementioned groups may be reversed, e.g., the vinyl addition latex polymer component may contain the hydrazide group and the polyurethane polymer may contain the carbonyl group.

In an alternative embodiment, a first component (e.g., a vinyl addition latex polymer component) contains a reactive functional end group such as an acetoacetoxy group. The acetoacetoxy group is available for crosslinking with an amine group. The amine group may be (i) attached to a second component (e.g., a polyurethane polymer) and/or (ii) part of a separate crosslinker compound. Alternatively (or in addition), the acetoacetoxy group may be crosslinked with a suitable metal ion. If desired, the aforementioned groups may be reversed, e.g., the vinyl addition latex polymer component may contain the amine group and the polyurethane polymer may contain the acetoacetoxy group.

In a further alternative embodiment, the vinyl addition latex polymer component and/or the polyurethane polymer contains a carboxyl group. The carboxyl group is available for crosslinking with a metal ion (e.g., Zinc, Zirconium, Calcium).

If desired, the compositions of the present invention may use more than one of the crosslinking reactions described above.

To produce "one-pack" compositions it is desirable to employ systems that "separate" the reactive functional groups prior to use.

In one embodiment, an acetoxyl functional group is blocked with an amine or with ammonia. Upon blocking of the acetoxyl functional groups, a polyamine as a crosslinker can be added to form a one-pack composition.

In another embodiment, the functional groups are separated in the separate phases of a dispersion or "latex." For example, the polymer phase comprises a first functional group and a second functional end group that is soluble in the continuous phase. Upon drying and coalescence of the composition the two phases become one and the reactive groups are able to react. Alternatively, the functional groups are provided on separated polymer particles. The polymer particles are separated by the continuous phase of the system. Upon drying and coalescence of the composition the two different polymer particles become intimately in contact and the first and second reactive groups are able to react.

Suitable vinyl addition latex polymers may be formed using a variety of monomers to impart the proper physical property to the final composition (e.g., Tg, flexibility, strength, concentration of reactive functional groups, etc.) It is recognized that an individual monomer may impart or influence more than one physical property in the polymer. However, for convenience it is possible to group monomers in the following general categories:

"soft" monomers (i.e., those monomers that facilitate formation of softer or lower Tg polymers or copolymers);
"hard" monomers (i.e., those monomers that facilitate formation of harder or higher Tg polymers or copolymers;
"acidic" monomers (i.e., those monomers, which may be "soft" or "hard", that comprise acidic groups); and functional group containing monomers (i.e., those monomers, which may be "soft" or "hard", that contain reactive functional groups).

By blending the various types of monomers it is possible to form polymers having the desired physical properties.

Suitable soft monomers include, but are not limited to, non-functional acrylic monomers, non-functional methacrylic monomers and vinyl monomers. A mixture of soft monomers can also be present in the vinyl addition latex polymer. As a general guide, suitable soft monomers include those monomers whose homopolymer has a Tg less than about 25° C.

Exemplary soft, non-functional acrylic and methacrylic monomers have the general formula (Formula I):

$$CH_2=C(R_5)C(O)OR_6$$

wherein $R_5$ is selected from the group consisting of hydrogen and methyl, and $R_6$ is an alkyl group, preferably having up to about 12 carbon atoms. (When $R_5$ is hydrogen, the monomer of formula I is an acrylic monomer and when $R_5$ is methyl, the monomer of formula I is a methacrylic monomer.)

Exemplary soft, non-functional acrylic monomers include, but are not limited to, methyl acrylate, ethyl acrylate, isopropyl acrylate, n-butyl acrylate, iso-butyl acrylate, 2-ethylhexyl acrylate, decyl acrylate, and n-octyl acrylate. Exemplary soft, non-functional methacrylic monomers include, but are not limited to, butyl methacrylate, 2-ethylhexyl methacrylate, iso-decyl methacrylate, lauryl methacrylate, n-octyl methacrylate, and tridecyl methacrylate. Other soft, non-functional monomers include, hexanediol diacrylate, acrylamideitaconic acid, N-ethoxymethylacrylamide, N-methylolacrylamide, vinyl acetate, vinyl propionate, vinyl butyrate, butadiene, and isoprene. n-butyl acrylate is the presently preferred soft, non-functional acrylic monomer.

Typically, the soft, non-functional monomer is present in an amount between about 2 and 98 weight percent, preferably between about 10 and 90 weight percent, more preferably between about 20 and 80 weight percent and most preferably between about 30 and 60 weight percent of the vinyl addition latex polymer.

Suitable hard monomers include, but are not limited to, alkylene aromatic monomers, non-functional acrylic monomers, non-functional methacrylic monomers, and acrylonitrile monomers. More preferably, the hard monomer is selected from the group consisting of alkylene aromatic monomers and non-functional methacrylic monomers. A mixture of hard monomers also can be present in the vinyl addition latex polymer. As a general guide, suitable hard monomers include those monomers whose homopolymer has a Tg greater than about 25° C.

Exemplary hard monomers include, but are not limited to, ethyl methacrylate, 2-hydroxy ethyl methacrylate, methyl methacrylate, iso-butyl methacrylate, isopropyl methacrylate, benzyl acrylate, ethylene dimethacrylate, methacrylamide, maleamide, styrene, vinyltoluene, 4-t-butylstyrene, α-methylstyrene, 2-chloromethylstyrene, divinylbenzene, p-styrenesulfonate, sodium acrylamido-2-methylpropanesulfonate, sodium 3-acryloxypropanesulfonate, N-methyl acrylamide vinyl formate, vinyl methyl ketone and vinyl butyl ketone.

Exemplary non-functional acrylic and methacrylic monomers include monomers having the above Formula I, wherein R5 is as previously defined and R6 is an alkyl group preferably containing up to about 6 carbon atoms. Typical hard, non-functional methacrylic monomers include methyl methacrylate, iso-butyl methacrylate, iso-propyl methacrylate, and mixtures thereof. An exemplary hard, non-functional acrylic monomer is tert-butyl acrylate.

Exemplary alkenyl aromatic monomers are represented by the general formula (Formula II):

$$Y_n-(Ar)-X$$

wherein X is preferably an aliphatic group containing at least one alkenyl bond, Y is an optional substituent (i.e., an optional substitute for hydrogen) on the aromatic ring (Ar), and n is the number of Y substituents on the ring, n being an integer from 0 to 5 for monocyclic six-membered aromatic compounds. Polycyclic aromatic compounds can have additional sites for Y substituents.

Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Vinyl is the most preferred X.

Y may be an organic or inorganic radical. When n is 2 or more, Y can be the same or different. If organic, Y generally contains from 1 to about 12 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 12 carbon atoms. Preferred Y substituents are chloride and unsubstituted alkyl groups of 1 to about 12 carbon atoms. Y is more preferably a chloride radical and C1 to about C6 unsubstituted alkyl radicals.

Illustrative alkenyl aromatic monomers include styrene, o-methyl styrene, p-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomer.

Typically, the hard, non-functional monomer is present in an amount between about 2 and 98 weight percent, preferably between about 10 and 90 weight percent, more preferably between about 20 and 80 weight percent and most preferably between about 30 and 60 weight percent of the vinyl addition latex polymer.

Suitable functional group containing monomers include carbonyl group-containing monomers, acetoacetoxy group-containing monomers, carboxyl group-containing monomers, etc.

Suitable carbonyl group-containing monomers include diacetone acrylamide, methyl vinyl ketone, acrolein, etc.

Suitable acetoacetoxy group-containing monomers include acetoacetoxy ethylmethacrylate (AAEM), acetoacetoxy ethylacrylate, etc. A mixture of functional group containing monomers also can be present in the polymer.

Exemplary functional group containing monomers of the vinyl addition latex polymer include 2-acetoacetoxy ethylacrylate, 2-acetoacetoxy ethylmethacrylate, N-(2-cyanoacetoxyethyl) acrylamide, 4-cyanoacetyl-1-methacyloylpiperazine, N-(2-propionylacetoxybutyl) acrylamide, N-(2-valerylacetoxyphenyl) acrylamide, N-4-(acetoacetoxymethyl) benzylmethacrylamide, N-4-(acetoacetoxybenzyl) phenylmethacrylamide, N-(2-acetoacetoxyethyl) acrylamide, N-(3-acetoacetamidopropyl) methacrylamide, N-(2-acetoacetamidoethyl) methacrylamide, 4-acetoacetyl-1-methacryloylpiperazine, acetoacetamidoethyl methacrylate, 4-acetoacetyl-1-acryloylpiperazine, N-(2-propionylacetoxyethyl) acrylamide, and N-(2-valerylacetoxypropyl) methacrylamide.

The functional group containing monomers of the vinyl addition latex polymer may preferably be present in an amount less than 25 weight percent of the total vinyl addition latex polymer content, more preferably between about 2 and 15 weight percent, and most preferably between about 4 and 12 weight percent.

A variety of acidic monomers may be used when forming the vinyl addition latex polymer component. In certain embodiments these monomers may facilitate catalysis of the crosslinking reaction, facilitate adhesion to certain substrates, and/or participate in the crosslinking reaction.

Suitable acidic monomers include olefinic carboxylic acid-based monomers (e.g., olefinic mono-carboxylic acid monomers and olefinic di-carboxylic acid monomers), sulfonic acid-based monomers (e.g., sulfoethylmethacrylate), and acidic monomers containing phosphate esters. Exemplary olefinic mono-carboxylic acids include, but are not limited to, acrylic acid, methacrylic acid, acryloxyacetic acid, methacryloxyacetic acid, β-carboxyethylacrylate, acrylamidoglycolic acid, and mixtures thereof. Exemplary olefinic di-carboxylic acids include, but are not limited to, itaconic acid, fumaric acid, and mixtures thereof. The preferred olefinic carboxylic acid monomers are selected from the group consisting of acrylic acid, methacrylic acid, and mixtures thereof.

The vinyl addition latex polymer preferably has an acid number of between about 1 and 90, more preferably between about 10 and 60, and most preferably between about 10 and 40. The acid number (as used in reference to the present compositions) is the number of milligrams of potassium hydroxide required to neutralize one gram of the solid acid-containing polymer. The acid number of an anhydride-containing polymer is determined by initially hydrolyzing the anhydride-containing polymer to obtain the corresponding acid containing polymer. The acid number is then determined in the same manner as for a acid containing polymer. The acid number of a salt compound may be determined as the number for a like acid-containing compound that has not been converted to the salt.

Preferably, the acidic monomer is present in an amount between about 0.5 and 20 weight percent, more preferably between about 1 and 15 weight percent and most preferably between about 2 and 10 weight percent of the vinyl addition latex polymer.

In one embodiment, the vinyl addition latex polymer comprises a soft monomer; a hard monomer; an acidic monomer, and a functional group containing compound. Preferably, the vinyl addition latex polymer comprises between about 2 and 80 weight percent of a soft monomer; between about 10 and 98 weight percent of a hard monomer; between about 0.5 and 20 weight percent of an acidic monomer; and between about 1 and 25 weight percent of a crosslinkable functional group containing compound.

Suitable vinyl addition latex polymers have glass transition temperatures between about −70 and 130° C., preferably between about −40 and 120° C., more preferably between about 20 and 100° C., and most preferably between about 20 and 80° C.

Commercially available vinyl addition latex polymers with at least a crosslinkable functional group include Joncryl 1970, and 1972 available from Johnson Polymers; Neocryl XK-12, and 14 available from Avecia; and Viacryl VSC 6295 available from Solutia.

Typically the solids content of the vinyl addition latex polymer is between about 10 and 70 weight percent, more preferably between about 20 and 60 weight percent, and most preferably between about 30 and 50 weight percent.

The amount of vinyl addition latex polymer in the waterborne coating composition of the present invention is typically present in an amount sufficient to provide a stoichiometric balance between the polyurethane dispersion and the vinyl addition latex polymer and achieve the best performance required. Preferably, the amount of vinyl addition latex polymer is between about 10 and 90, more preferably between about 20 and 90, and most preferably between about 30 and 80 weight percent of the coating composition.

Suitable polyurethane dispersions having functional end groups for use in the coating compositions of the present invention include polyurethane polymers formed as a reaction product of one or more isocyanate compounds and one or more alcohol compounds.

Suitable isocyanate compounds include mono- and di-isocyanates, with diisocyanates being preferred. Suitable diisocyanates useful in the preparation of the polyurethane dispersion having functional end groups may be aliphatic, alicyclic or aromatic. Examples include, but are not limited to, ethylene diisocyanate, tetramethylene diisocyanate, 2,3-dimethylethylene diisocyanate, ethylethylene diisocyanate, 1,6-hexamethylene diisocyanate, 1,12-dodecane diisocyanate, 2-methylpentamethylene diisocyanate, 1-methyltrimethylene diisocyanate, isophorone diisocyanate, 2,4,4-trimethylhexamethylene diisocyanate, 1,3-cyclopentylene diisocyanate, cyclohexylene-1,4-diisocyanate, 4,4'-dicyclohexylmethane diisocyanate, 4,4'-dicyclohexylmethane diisocyanate, lysine diisocyanate, 3,3-dimethyl-4,4'-biphenylene diisocyanate, 3,3'-dimethoxy-4,4'-biphenylene diisocyanate, 3,3'-dichloro-4,4'-biphenylene diisocyanate, 1,5-, tetrahydronaphthalene diisocyanate, p-xylylene diisocyanate, tetramethylxylylene diisocyanate, 1,4-phenylene diisocyanate, 2,4-tolylene diisocyanate, 2,6-tolylene diisocyanate, 4,4'-diphenylmethane diisocyanate, 2,4'-diphenylmethane diisocyanate, 1,5-naphthylene diisocyanate, bis(4-isocyanatocycloether-4,4-diisocyanatodiphenylhexyl) methane and others as is known in the art. Mixtures of diisocyanates may also be used.

Preferred isocyanates include aliphatic and alicyclic isocyanates listed above. Aliphatic diisocyanates are more preferred, and 4,4'-dicyclohexylmethane diisocyaante is most preferred.

Suitable alcohol compounds include mono-functional alcohols and poly-functional alcohols (polyols). Suitable polyols useful in the preparation of the polyurethane polymer include any in the various chemical classes of polyols (such as diols, triols and glycols). The polyols may be polyesters, polyesteramides, polythioethers, polyethers, polycarbonates, polyolefins or polysiloxanes. Mixtures of such polyols may also be used.

Polyester polyols include hydroxy-terminated reaction products of polyols with polycarboxylic acids or their ester-forming derivatives. Polyether polyols include the products of polymerization of a cyclic oxide or by the addition of one or more oxides to polyfunctional initiators. Polythioether polyols include products obtained by condensing thiodiglycol ether alone or with other glycols, dicarboxylic acids, formaldehyde, aminoalochols or aminocarboxylic acids. Polycarbonate polymers include products obtained by reacting diols with diaryl carbonates or with phosgene. Suitable polyolefin polyols include hydroxy-terminated butadiene homo- and copolymers.

Examples of useful non carbonyl-substituted polyols include, but are not limited to, ethylene glycol, diethylene glycol, triethylene glycol, 1,2-propylene glycol, 1,3-butylene glycol, tetramethylene glycol, 1,6-hexanediol, neopentyl glycol, hexamethylene glycol, decamethylene glycol, octanediol, tricyclodecanedimethylol, furan dimethanol, hydrogenated bisphenol A, cyclohexandimethanol, glycerol, trimethylolpropane, pentaerythritol and others as is known in the art. Polyester diols, such as 1,6-hexanediol and cyclohexanedimethanol and glycols such as neopentyl glycol adipate, poly(hexamethylene adipate)glycol, poly(tetramethylene)glycol, poly(caprolactone)glycol, poly(carbamate)glycol and poly(tetramethylene adipate)glycol are preferred.

Other polyols useful in the present invention include one or more carbonyl-substituted polyols (for example, diols or triols). Useful carbonyl-substituted polyols include dihydroxyalkanoic acids (such as 2,2-dimethylolpropionic acid), and aminocarboxylic acids (such as lysine, cystine and 3,5-diaminobenzoic acid). A preferred carbonyl-substituted polylol is 2,2-dimethylolpropionic acid.

Other useful polyols are described, for example, in U.S. Pat. No. 4,066,591; U.S. Pat. No. 4,927,876; U.S. Pat. No. 5,137,961; and U.S. Pat. No. 5,916,960, which are herein incorporated by reference.

The polyurethane polymer is preferably prepared in a conventional manner by reacting a stoichiometric excess of the diisocyanate with the polyols at a temperature between about 30 and 130° C. until the reaction between the diisocyanate and the polyols is substantially complete. Preferably, the diisocyanate and the polyols are present in such proportions that the ratio of isocyanate groups to the hydroxy groups is in the range of from about 1.1:1 to 6:1, and more preferably in the range of from about 1.5:1 to 3:1.

If desired, catalysts such as dibutyltin dilaurate and stannous octoate may be used to facilitate the polyurethane polymer formation, and a solvent (preferably non-reactive) may be added before or after polymer formation to control the viscosity.

Suitable solvents include, but are not limited to, acetone, methyl ethyl ketone (MEK), N,N-dimethylformamide, ethylene carbonate, propylene carbonate, diglyme, N-methylpyrrolidone (NMP), ethyl acetate, ethylene diacetates, propylene glycol diacetates, alkyl ethers of ethylene, propylene glycol monoacetates, toluene, xylene and sterically hindered alcohols (such as t-butanol and diacetone alcohol). Presently preferred solvents include water-miscible solvents such as NMP.

Aqueous polyurethane dispersions having functional end groups may be prepared by dispersing a water-dispersible polymer in an aqueous medium and chain extending the polymer with one or more active hydrogen containing non-aromatic chain extenders. Dispersing the polymer in water can be accomplished using well-known techniques. Preferably, the polymer is added to water with agitation. Alternatively, water can be stirred into the polymer.

The functional group of the polyurethane dispersion may preferably include a reactive group that is bonded to at least one end site on the polyurethane polymer. Suitable chain extenders include, but are not limited to, polyamines such as ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl)amine, isophorone diamine, 3,3'-dinitrobenzidine, 4,4'-methylenebis(2-chloroaniline), 3,3'-dichloro-4,4'-biphenyl diamine, hydrazines, dihydrazides, and the like. Preferred chain extenders include non-aromatic chain extenders, such as polyamines, isophorone diamine, ethylene diamine, diethylene triamine, cyclohexane diamine, hydrazines, and dihydrazides.

The chain extender may preferably be added to the aqueous dispersion of the polyurethane polymer, or it may already be present when the polyurethane polymer is dispersed in water. Chain extension preferably is conducted at any convenient temperature between about 5 and 95° C. The amount of chain extender may be approximately equivalent to the free isocyanate groups in the polyurethane polymer, preferably more than the stoichiometric amount of the free isocyanate. The ratio of active hydrogen in the chain extender to isocyanate groups is preferably in the range of from about 1:1 to 2:1 so that the content of the end amine functional group may be present at from about 0.5 to 10 weight percentage.

Suitable reactive groups of the polyurethane dispersion include polyamine, dihydrazide, acetoacetoxyl, diacetone groups, and the like. Preferred functional reactive groups include polyamine, dihydrazide, and combinations thereof.

A typically useful polyurethane dispersion having functional end groups may be formed from the reaction product of poly(1,6-hexanediol/neopentyl glycol) adipate, 2,2-dimethylol propionic acid, and 4,4'-dicyclohexylmethane diisocyanate, neutralized with an amine such as triethylamine and chain-extended using a polyamine such as adipic dihydrazide. This and other similarly functional aqueous polyurethane dispersions are commercially available under the tradename NeoRez, from Zeneca Resins, and Spensol from Reichhold.

The amount of polyurethane dispersion present in the waterborne coating composition is preferably between about 10 and 90 weight percent of the coating composition, more preferably between about 10 and 80 weight percent and most preferably between about 20 and 60 weight percent.

Although the vinyl addition latex polymer and the polyurethane dispersion are crosslinkable, an optional additional crosslinker may be included.

Typical crosslinkers include generally water miscible or soluble compounds that will react with the functional groups of the vinyl addition latex polymer and/or the polyurethane dispersion.

The crosslinker of the present invention is typically present in an amount sufficient to cause or facilitate the crosslinking within the desired time and temperature. The crosslinker may be incorporated in the vinyl addition latex polymer, incorporated in the polyurethane dispersion, added at any suitable opportunity during the process of preparing the coating composition, or in combination as is known in the art.

Suitable crosslinkers include polyamine, dihydrazide, metallic chelating oxides, acetoacetoxyethyl methacrylate (AAEM), diacetone acrylamide (DAAM), or combinations thereof.

Suitable polyamine crosslinkers include, for example, ethylene glycol diamine. A presently preferred polyamine crosslinker is polyethylene glycol diamine, available as Jeffamine D-230 from Henkel Corporation.

Suitable dihydrazide crosslinkers useful in facilitating the self-crosslinking of the coating composition include, for example adipic dihydrazide, sebacic dihydrazide, isophthalic dihydrazide. Presently preferred dihydrazide crosslinkers include adipic dihydrazide available from Kyowa Hakko USA, Inc.

Metallic chelating oxides may optionally be included as crosslinkers to facilitate the self-crosslinking of the vinyl addition latex polymer with the polyurethane polymer. Typical metallic chelating oxides include zinc oxides, water soluble or miscible aluminum, zirconium carbonate, titanium organo agents. Preferred metallic chelating oxide crosslinker includes zinc oxides, aluminum oxides, acetylacetonate titanate, and lactic acid titanate.

Suitable acetoacetoxyl methacrylate crosslinkers include ammonia blocked water soluble or miscible compounds with chain extended end groups comprising acetoacetoxyl functional groups.

Suitable diacetone acrylamide crosslinkers include water soluble or miscible compounds with diacetone functional ending groups.

Preferably, the crosslinker is present in the amount up to about 20 weight percent, more preferably about 1 and 15 weight percent, and most preferably between about 3 and 10 weight percent of the total coating composition.

Optional adjuvants useful in the present invention include UV stabilizers, cosolvents, coalescents, wetting agents (e.g., non-ionic surfactants, organo silicones), flow and leveling agents (e.g., silicones, fluoro surfactants), viscosity modifiers, pH control agents, slip resistant agents, mar resistant agents (e.g., waxes), biocides (e.g., azolidines), and pigments that may further include flatting, sanding, and/or hiding agents.

Preferred UV stabilizers provide the coating composition with color stability and/or resistance to yellowing. Typically UV stabilizers are present in an amount sufficient to provide color stability without blooming. As used herein, "blooming" refers to the migration of the UV stabilizer or other adjuvants to the surface of a coated substrate. Blooming typically occurs as the coated substrate undergoes reaction with UV light. Preferred UV stabilizers include Benzophenones, and HALS (Hindered Amine Light Stabilizers).

Cosolvents may optionally be used in the present invention. The use of cosolvents, however, may contribute to an undesirable high level of volatile organic compounds that would have to be removed or recovered. A careful selection of cosolvents useful in the present invention is preferable to provide a coating composition having a low volatile organic compound content. Typical cosolvents useful in the present invention were ethylene and/or propylene glycols, mono or diethers, and also include other organic materials, such as xylene, toluene, butanol, 2-butoxyethanol, amyl alcohol, and 2-hexyloxyethanol. Presently preferred cosolvents include ethylene and/or propylene glycols, mono or diethers.

These adjuvants (not including pigments) are preferably used in amounts less than about 10 weight percent, more preferable less than about 6 weight percent of the total coating composition.

Suitable pigments include flatting, sanding, and/or hiding agents. Pigments are preferably used to give the coating composition the required finish on the packaging. Pigments may also be used to incorporate a desired color to the substrate, for example, white pigment may be used to form a coating composition having a white color. Alternatively, or in concert with having a desired color, pigments may be used to give the substrate a matte finish (as with flatting agents) and/or to hide defects, and the like. Suitable pigments in this invention are present in the amount sufficient to give the desired opacity, finish texture, and/or general aesthetic quality to the coated substrate. Suitable pigments include aluminum oxides, titanium oxides, zinc oxides, and the like. An example of a pigment usable in the present invention includes Ti-Pure R-900, available from E. I. duPont de Nemours of Wilmington, Del.; Syloid 169, available from W. R. Grace Company of Baltimore, Md.; and Minex 10, available from Unimin Corporation of New Canaan, Conn. Typical amount of pigments usable in the present invention may depend on intended finish. For example, the amount of pigment used in the present invention is preferably less than about 20 weight percent of the coating composition.

Combinations

As disclosed above, the first and second functional groups may be attached to either the polyurethane or the vinyl addition latex polymer. Those skilled in the art will readily recognize that various combinations of these functional groups are feasible to obtain the coating composition of the present invention. These combinations are deemed within the scope of the present invention. Without being limited to disclosed embodiments, the following are typical combinations that may be used to obtain a waterborne coating composition that is crosslinkable at low temperatures and is preferably substantially free of formaldehyde. In addition, it has been discovered that the use of an optional crosslinker may function as a "bridge" or link between the functional end groups on the polyurethane and vinyl addition latex polymers. The table below illustrates some of the possible combinations.

TABLE A

Functional End Group Combinations

| Polyurethane | Latex | Crosslinker |
|---|---|---|
| AAEM/DAAM | AAEM/DAAM | Amine/Dihydrazide |
| AAEM/DAAM | Amine/Dihydrazide | Amine/Dihydrazide |
| AAEM/DAAM | Amine/Dihydrazide | AAEM/DAAM |
| Amine/Dihydrazide | AAEM/DAAM | AAEM/DAAM |
| Amine/Dihydrazide | AAEM/DAAM | Amine/Dihydrazide |
| Amine/Dihydrazide | Amine/Dihydrazide | AAEM/DAAM |

In certain embodiments, the coating composition of the present invention is substantially free of formaldehyde. In preferred embodiments the coating composition of the present invention is essentially free of formaldehyde, more preferably essentially completely free of formaldehyde, and most preferably completely free of formaldehyde.

The term "substantially free of formaldehyde" means that the coating compositions of the present invention are contaminated with, or liberate as a result of curing, no more than about 1 percent by weight formaldehyde. The term "essentially free of formaldehyde" means that the coating compositions of the present invention are contaminated with, or liberate as a result of curing, no more than about 0.5 percent by weight formaldehyde. The term "essentially completely free of formaldehyde" means that the coating compositions of the present invention are contaminated with, or liberate as a result of curing, no more than about 0.25 percent by weight formaldehyde. The term "completely free of formaldehyde" means that the coating compositions of the present invention are contaminated with, or liberate as a result of curing, less than 5 parts per million (ppm) formaldehyde.

The coating composition of the present invention may preferably be useful to protect the surfaces of substrates such as metals, plastics, wood, ceramics, paper products and the like.

The coating composition may be applied by a variety of processes. Typical application processes include sheet coating, coil coating, roll coating, spray coating, and the like. In a typical spray coating process, the intended substrate is preferably flat prior to coating. The flat substrate (e.g., wood) may then be cured under ambient conditions (e.g., low temperature) or by the application of curing agents (e.g., heat and/or radiation) to coalesce the coating.

Test Methods

The constructions cited were evaluated as follows:

Solvent Resistance

The cure of a coating is measured as a resistance to solvents, such as Methyl Ethyl Ketone (MEK) or Acetone. This test was accomplished as described in ASTM D 5402-93.

A 15.2 cm.×25.4 cm. (6 in.×10 in.) coated panel was manually rubbed in a back-and-forth motion using a clean cheesecloth soaked in MEK. The number of double rubs (i.e., one back-and-forth motion) to failure was recorded. Failure occurs when the coating is broken through to reveal the substrate panel.

Stain Resistance

The stain resistance measures the ability of the coating to resist staining test materials after contacting with the coating for a period of time. The staining test materials are usually food grade ketchup, grape juice, orange juice, French yellow mustard, and so on. Of the staining test materials, French yellow mustard is generally the most severe, generating strong yellowing after contacting. Therefore, French yellow mustard is used to evaluate the coatings' stain resistance. The test samples were prepared by drawing down a coating 0.05 mm (2 mils) wet thickness on a white Leneta chart. The coated samples were air-flashed for 15 min, and then dried at 50° C. for 24 hours. A scoop (2-5 grams) of French yellow mustard was applied on one half of the sample and allowed to remain in contact with the surface of the sample for 1 hour. Afterwards, the French yellow mustard was flushed away by water, and the surface of sample was dried using a paper towel. Immediately, the staining was evaluated based on the CIE L*a*b* color scheme against the untested area on the sample using a spectrophotometer such as Spectraflash, Model No. SF300, from Datacolor, Inc. The resulting Delta E ($\Delta E$) was used to assess the stain resistance of the coating to the French yellow mustard. The greater the Delta E, the less the stain resistance.

UV Stability

The UV stability measures the ability of the samples to resist yellowing after exposure to UV light. The test samples were coated on a white glass plate 0.05 mm (2 mils) wet thickness. The coated samples were air-flashed for 15 minutes and dried for 24 hours at 50° C. One half of each coated sample was subjected to UV (A or B) exposure for 48 hours. The color of the exposed and unexposed portions were measured per the CIE color scheme as described above for stain resistance. Again, the difference is shown in "Delta E" ($\Delta E$) based on the L*a*b* scale.

KCMA Test

For wood kitchen cabinets, the water resistance (edge soak), and chemical and stain resistance of the coating were evaluated under the 2002 American National Standards (ANS) of the Kitchen Cabinet Manufacturers Association (KCMA). In particular, chemical resistance tests the ability of the finish to withstand substances typically found in the kitchen and bath. The water resistance measures the proper application of the finish.

For chemical resistance, 3 grams of French Yellow mustard was applied to the exterior portion of the cabinet and allowed to remain in contact with the surface of the sample for 1 hour. The mustard was then sponge washed with clear water and dried with a clean cloth. The sample fails if there is appreciable stain, discoloration, or whitening of the surface measurable as "Delta E" ($\Delta E$) based on the L*a*b* scale.

For water resistance, a #8 cellulose sponge soaked in one half percent by weight of dishwashing detergent and water was used. The edge of the cabinet was placed on the sponge and permitted to stand for 24 hours. The sample fails if there is discoloration, blistering, chocking (small cracks in the finish), whitening or other film failures.

EXAMPLES

The following examples are offered to aid in understanding of the present invention and are not to be construed as limiting the scope thereof. Unless otherwise indicated, all parts and percentages are by weight.

Example 1

Preparation of Clear Coating Formulation

In a stainless steel vessel equipped with an agitator, and a thermometer, was charged acrylic polymer (Joncryl 1972, available from Johnson Polymers), and polyurethane polymer (NeoRez 9679 available from Zeneca Resins), under normal agitation (400-600 rpm). Water and cosolvents (Glycol Ether DPM from Ashland Chemical and Dowanol DPnB from Dow Chemical) were added. The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 1

Preparation of Clear Coating Formulation

| Material | Parts by Weight |
| --- | --- |
| Acrylic Polymer | 47.2 |
| Polyurethane Dispersion | 33.2 |
| Water | 4.8 |
| DPM glycol ether | 3.0 |
| Dowanol DPnB | 1.7 |
| Slip/Mar resistant agent | 4.2 |
| Substrate wetting agent | 0.3 |
| Coating flowing/wetting agent | 0.2 |
| Viscosity Controlling agent(s) | 0.3 |
| UV stabilizer | 0.6 |
| Biocide | 0.1 |
| pH controlling agent | 0.2 |
| Defoamers | 0.2 |
| Water | 4.0 |

Example 2

Preparation of Comparable Clear Coating Formulation

In a stainless steel vessel equipped with an agitator, and a thermometer, was charged acrylic polymer (Joncryl 1972, available from Johnson Polymers), water and cosolvents (Glycol Ether DPM from Ashland Chemical and Dowanol DPnB from Dow Chemical) under normal agitation (400-600 rpm). The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 2

Preparation of Comparable Clear Coating Formulation

| Material | Parts by Weight |
| --- | --- |
| Acrylic polymer | 77.9 |
| Water | 8.3 |
| DPM glycol ether | 3.0 |
| Dowanol DPnB | 1.7 |
| Slip/Mar resistant agent | 4.1 |
| Substrate wetting agent | 0.3 |
| Coating flowing/wetting agent | 0.2 |
| Viscosity Controlling agent(s) | 0.4 |
| UV stabilizer | 0.6 |
| Biocide | 0.1 |
| pH controlling agent | 0.2 |
| Defoamers | 0.2 |
| Water | 3.0 |

Example 3

Preparation of Clear Coating Formulation

In a stainless steel vessel equipped with an agitator and a thermometer, was charged acrylic polymer (Joncryl 1972, available from Johnson Polymers), and polyurethane polymer (NeoRez 9679 available from Zeneca Resins), under normal agitation (400-600 rpm). Water and cosolvents (Glycol Ether DPM from Ashland Chemical and Dowanol DPnB from Dow Chemical) were added. The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 3

Preparation of Clear Coating Formulation

| Material | Parts by Weight |
| --- | --- |
| Acrylic Polymer | 32.2 |
| Polyurethane Dispersion | 47.7 |
| Water | 4.8 |
| DPM glycol ether | 3.0 |
| Dowanol DPnB | 1.7 |
| Slip/Mar resistant agent | 4.2 |
| Substrate wetting agent | 0.3 |
| Coating flowing/wetting agent | 0.2 |
| Viscosity Controlling agent(s) | 0.3 |
| UV stabilizer | 0.6 |
| Biocide | 0.1 |
| pH controlling agent | 0.2 |
| Defoamers | 0.2 |
| Water | 4.0 |

Example 4

Preparation of Clear Coating Formulation

In a stainless steel vessel equipped with an agitator and a thermometer, was charged acrylic polymers (Joncryl 1972 available from Johnson Polymers, and Neocryl A-550 from Avecia), and polyurethane polymer (NeoRez 9679 available from Zeneca Resins), under normal agitation (400-600 rpm). Water and cosolvents (Glycol Ether DPM from Ashland Chemical and Dowanol DPnB from Dow Chemical) were added. The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 4

Preparation of Clear Coating Formulation

| Material | Parts by Weight |
| --- | --- |
| Acrylic Polymer | 35.8 |
| Polyurethane dispersion | 34.4 |
| Acrylic Polymer | 10.1 |
| Water | 4.8 |
| DPM glycol ether | 3.0 |
| Dowanol DPnB | 1.7 |
| Slip/Mar resistant agent | 4.2 |
| Substrate wetting agent | 0.3 |
| Coating flowing/wetting agent | 0.2 |
| Viscosity Controlling agent(s) | 0.3 |
| UV stabilizer | 0.6 |
| Biocide | 0.1 |
| pH controlling agent | 0.2 |
| Defoamers | 0.2 |
| Water | 4.0 |

Example 5

Preparation of Clear Coating Formulation

In a stainless steel vessel equipped with an agitator and a thermometer, was charged acrylic polymer (Viacryl VSC 6295 available from Solutia), and polyurethane polymer (NeoRez 9679 available from Zeneca Resins), under normal agitation (400-600 rpm). Water and cosolvents (Glycol Ether DPM from Ashland Chemical and Dowanol DPnB from Dow Chemical) were added. The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 5

Preparation of Clear Coating Formulation

| Material | Parts by Weight |
| --- | --- |
| Acrylic Polymer | 42.0 |
| Polyurethane Dispersion | 34.6 |
| Water | 4.8 |
| DPM glycol ether | 3.0 |
| Dowanol DPnB | 1.7 |
| Slip/Mar resistant agent | 4.2 |
| Substrate wetting agent | 0.3 |
| Coating flowing/wetting agent | 0.2 |
| Viscosity Controlling agent(s) | 0.3 |
| UV stabilizer | 0.6 |
| Biocide | 0.1 |
| pH controlling agent | 0.2 |
| Defoamers | 0.2 |
| Water | 7.9 |

Example 6

Preparation of Comparative Clear Coating Formulation

In a stainless steel vessel equipped with an agitator and a thermometer, was charged acrylic polymer (Viacryl VSC 6295 available from Solutia), water and cosolvents (Glycol Ether DPM from Ashland Chemical and Dowanol DPnB from Dow Chemical) were charged and blended under normal agitation (400-600 rpm). The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 6

Preparation of Comparative Clear Coating Formulation

| Material | Parts by Weight |
| --- | --- |
| Acrylic Polymer | 69.3 |
| Water | 12.9 |
| DPM glycol ether | 3.0 |
| Dowanol DPnB | 1.7 |
| Slip/Mar resistant agent | 4.2 |
| Substrate wetting agent | 0.3 |
| Coating flowing/wetting agent | 0.2 |
| Viscosity Controlling agent(s) | 0.3 |
| UV stabilizer | 0.6 |
| Biocide | 0.1 |
| pH controlling agent | 0.2 |
| Defoamers | 0.2 |
| Water | 7.1 |

Example 7

Preparation of Pigmented Clear Coating Formulation

In a stainless steel vessel equipped with an agitator, pigment (Syloid 169 obtainable from W.R. Grace Company, and Minex 10 obtainable from Unimin Corporation) were charged and blended at high speed (1500-2500 rpm) for 15 minutes to obtain a fineness of 5 on the Hegman scale. Acrylic polymer (Joncryl 1972, available from Johnson Polymers), and polyurethane polymer (NeoRez 9679 available from Zeneca Resins) were then charged under normal agitation (400-600 rpm). Water and cosolvents (Glycol Ether DPM from Ashland Chemical and Dowanol DPnB from Dow Chemical) were added. The following adjuvants; slip/mar resistant agent (BYK 333 from BYK Chemie), wetting agents (BYK 347), flowing agent (BYK 346), viscosity control agent (Acrysol RN 825 from Rohm & Haas), UV stabilizer (Fadex JM from Clarint Corporation of Charlotte, N.C.), biocide (Troysan 192 from Troy Chemical), pH controlling agent (30% ammonia solution from Ashland Chemical), and defoamer (BYK 25) were charged and blended under normal agitation. Water was then added. Each charge was added after a uniform solution of the previous charge was obtained.

TABLE 7

Preparation of Pigmented Clear Coating Formulation

| Material | Parts by Weight |
| --- | --- |
| Acrylic Polymer | 46.1 |
| Polyurethane Dispersion | 32.3 |
| DPM glycol ether | 2.9 |
| Dowanol DPnB | 1.7 |
| Slip/Mar resistant agent | 4.1 |
| Substrate wetting agent | 0.4 |
| Coating flowing/wetting agent | 0.2 |
| Viscosity Controlling agent(s) | 0.2 |
| UV stabilizer | 0.6 |
| Biocide | 0.1 |
| pH controlling agent | 0.1 |
| Defoamers | 0.2 |
| Water | 5.4 |
| Pigment | 3.5 |
| Pigment | 2.1 |

Example 8

Evaluation of Coated Substrates

The coating compositions of Examples 1-7 were each coated on black Leneta Charts at 0.05 mm (2 mils) wet thickness, air-flashed for 15 minutes, and dried at 50° C. for 24 hours. All samples passed the Kitchen Cabinet Manufacturer's Association (KCMA) edge-soak test, stain and chemical resistance tests. The samples were then evaluated as shown below. Solvent resistance was evaluated after 0.5 hours (30 minutes), 5 hours and 24 hours. Color stability was evaluated after 24 hours exposure to UV(A) accelerated weathering.

TABLE 8

Evaluation of Coated Substrates

| Ex. # | Solvent Resistance @ 25° C. | | | Solvent Resistance @ 50° C. | | | Color ΔE |
| --- | --- | --- | --- | --- | --- | --- | --- |
| | 0.5 hours | 5 hours | 24 hours | 0.5 hours | 5 hours | 24 hours | |
| 1 | 5 | 13 | 23 | 19 | 27 | 42 | 4.23 |
| 2 | 1-2 | 4 | 7 | 8 | 9 | 12 | 6.01 |
| 3 | 6 | 15 | 28 | 26 | 41 | 56 | 4.08 |
| 4 | 6 | 17 | 31 | 31 | 47 | 63 | 3.92 |
| 5 | 8 | 15 | 26 | 17 | 25 | 46 | 2.31 |
| 6 | 3 | 7 | 11 | 13 | 18 | 25 | 2.52 |
| 7 | 5 | 11 | 21 | 22 | 25 | 39 | 4.21 |

Having thus described the preferred embodiments of the present invention, those of skill in the art will readily appreciate that the teachings found herein may be applied to yet other embodiments within the scope of the claims hereto attached. The complete disclosures of all patents, patent documents, and publications are incorporated herein by reference as if individually incorporated.

What is claimed is:

1. A composition, comprising:
   a vinyl addition latex polymer having a first crosslinkable functional group;
   a polyurethane dispersion having a second crosslinkable functional end group comprising an acetoacetoxyl or diacetone group or combination thereof; and
   an optional crosslinker,
   wherein the composition is in the form of a waterborne coating composition, and wherein the first crosslinkable functional group of the vinyl addition latex polymer and the second crosslinkable functional end group of the polyurethane dispersion self-crosslink via polymer-to-polymer reaction at low temperature upon coalescence.

2. The composition of claim 1, wherein the waterborne coating composition is essentially formaldehyde free.

3. The composition of claim 1, wherein the first crosslinkable functional group of the vinyl addition polymer comprises an amine group.

4. The composition of claim 1, wherein the first crosslinkable functional group comprises a hydrazide group.

5. The composition of claim 1, wherein the first crosslinkable functional group comprises an amine or hydrazide group or combination thereof, and wherein the second crosslinkable functional end group comprises a diacetone group.

6. The composition of claim 1, wherein the vinyl addition latex polymer is selected from the group consisting of: acrylates, methacrylates, styrenes, and vinyl monomers.

7. The composition of claim 1, wherein the acid number of the vinyl addition latex polymer is between about 1 and 90.

8. The composition of claim 1, wherein the vinyl addition latex polymer has a glass transition temperature of between about −70 and 130° C.

9. The composition of claim 1, wherein the vinyl addition latex polymer comprises between about 10 and 90 weight percent of the coating composition.

10. The composition of claim 1, wherein the polyurethane dispersion comprises between about 10 and 90 weight percent of the coating composition.

11. The composition of claim 1, wherein the polyurethane dispersion is formed from the reaction product of a diisocyanate(s) and a polyol(s).

12. The composition of claim 11, wherein the diisocyanate comprises an aliphatic or aromatic diisocyanate.

13. The composition of claim 11, wherein the polyol comprises a polyester, polyether, or polycarbonate polyol.

14. A composition comprising:
   a vinyl addition latex polymer having a first crosslinkable functional group;
   a polyurethane dispersion having a second crosslinkable functional end group; and
   a crosslinker;
   wherein the composition is in the form of a waterborne coating composition;
   the first crosslinkable functional group of the vinyl addition latex polymer and the second crosslinkable functional end group of the polyurethane dispersion self-crosslink via polymer-to-crosslinker reaction of the vinyl addition polymer with the crosslinker and polymer-to-crosslinker reaction of the polyurethane dispersion with the crosslinker at low temperature upon coalescence; and
   the first crosslinkable functional group comprises a diacetone, amine or hydrazide group or combination thereof and the second crosslinkable functional group comprises a carbonyl, acetoacetoxyl, polyamine or hydrazide group or combination thereof; or
   the first crosslinkable functional group comprises a carbonyl, acetoacetoxyl, amine or hydrazide group or combination thereof and the second crosslinkable functional group comprises a diacetone, amine or hydrazide group or combination thereof.

15. The composition of claim 14, wherein the crosslinker comprises between about 0.5 and 20 weight percent of the coating composition.

16. The composition of claim 14, wherein the crosslinker is selected from the group consisting of: polyamines, dihydrazides, diacetones, acetoacetoxyl compounds, and combinations thereof.

17. The composition of claim 1, wherein the coating composition further comprises adjuvants selected from the group consisting of: pigments, cosolvents, wetting agents, UV stabilizers, pH control agents, viscosity control agents, flow control agents, leveling agents, biocides, and combinations thereof.

18. The composition of claim 1, wherein the first and second functional groups are separated in separated phases of a dispersion.

19. The composition of claim 1, wherein the coating composition is available in a one-pack composition.

20. A composition, comprising:
   about 10 to 90 weight percent vinyl addition latex polymer having a first crosslinkable functional group, wherein the vinyl addition latex polymer has an acid number of between about 10 to 60;
   about 10 to 90 weight percent polyurethane dispersion having a second crosslinkable functional end group; and
   about 1 to 20 weight percent crosslinker;
   wherein the composition is in the form of a waterborne coating composition, the first crosslinkable functional group of the vinyl addition latex polymer and the second crosslinkable functional end group of the polyurethane dispersion self-crosslink at low temperature upon coalescence and the coating composition is essentially formaldehyde free.

21. An article, comprising:
   a substrate; and
   a coating on the substrate, wherein the coating is a coalesced film made from a coating composition comprising:
   a vinyl addition latex polymer having a first crosslinkable functional group;
   a polyurethane dispersion having a second crosslinkable functional end group; and
   a crosslinker,
   wherein the coating composition is in the form of a waterborne coating composition; the coating composition is crosslinkable via polymer-to-crosslinker reaction of the vinyl addition polymer with the crosslinker and polymer-to-crosslinker reaction of the polyurethane dispersion with the crosslinker at low temperature upon coalescence; and
   the first crosslinkable functional group comprises a diacetone, amine or hydrazide group or combination thereof and the second crosslinkable functional group comprises a carbonyl, acetoacetoxyl, amine or hydrazide group or combination thereof; or
   the first crosslinkable functional group comprises a acetoacetoxyl, amine or hydrazide group or combination thereof and the second crosslinkable functional group comprises a diacetone, amine or hydrazide group or combination thereof.

22. The article of claim 21, wherein the substrate is selected from the group consisting of: wood, metals, plastics, ceramics and paper products.

23. The article of claim 21, wherein the substrate is wood.

24. A method of coating a substrate, comprising the steps of:
providing a coating composition comprising:
a vinyl addition latex polymer having a first crosslinkable functional group;
a polyurethane dispersion having a second crosslinkable functional end group comprising an acetoacetoxyl or diacetone group or combination thereof; and
water;
coalescing the coating composition at a low temperature to form a coating; and
crosslinking the coating composition,
wherein the coating composition is essentially formaldehyde free, and the first crosslinkable functional group of the vinyl addition latex polymer and the second crosslinkable functional end group of the polyurethane dispersion self-crosslink via polymer-to-polymer reaction.

25. The method of claim 24, wherein the coalescing of the coating composition is accomplished at a temperature between about 15 and 90° C.

26. The method of claim 24, wherein the coalescing of the coating composition is accomplished at a temperature between about 20 and 70° C.

27. The method of claim 24, wherein the coalescing of the coating composition is accomplished at a temperature between about 20 and 50° C.

28. A composition comprising:
a vinyl addition latex polymer having a first crosslinkable functional group;
a polyurethane dispersion having a second crosslinkable functional end group; and
a crosslinker comprising a diacetone, acetoacetoxyl or dihydrazide compound, or combination thereof;
wherein the composition is in the form of a waterborne coating composition; and the first crosslinkable functional group of the vinyl addition latex polymer and the second crosslinkable functional end group of the polyurethane dispersion self-crosslink via polymer-to-crosslinker reaction of the vinyl addition polymer with the crosslinker and polymer-to-crosslinker reaction of the polyurethane dispersion with the crosslinker at low temperature upon coalescence.

29. A composition comprising:
a vinyl addition latex polymer having a first crosslinkable functional group;
a polyurethane dispersion having a second crosslinkable functional end group; and
a crosslinker;
wherein the composition is in the form of a waterborne coating composition; at least one of the first crosslinkable functional group, second crosslinkable functional end group and crosslinker comprises a diacetone group; at least one of the first crosslinkable functional group, second crosslinkable functional end group and crosslinker comprises an amine or hydrazide group; and the first crosslinkable functional group of the vinyl addition latex polymer and the second crosslinkable functional end group of the polyurethane dispersion self-crosslink via polymer-to-crosslinker reaction of the vinyl addition polymer with the crosslinker and polymer-to-crosslinker reaction of the polyurethane dispersion with the crosslinker at low temperature upon coalescence.

30. A composition comprising:
a vinyl addition latex polymer having a first crosslinkable functional group comprising an amine or hydrazide group;
a polyurethane dispersion having a second crosslinkable functional end group comprising an acetoacetoxyl or diacetone group; and
a crosslinker comprising a polyamine, dihydrazide, diacetone or acetoacetoxyl compound, or combination thereof;
wherein the composition is in the form of a waterborne coating composition; and the first crosslinkable functional group of the vinyl addition latex polymer and the second crosslinkable functional end group of the polyurethane dispersion self-crosslink at low temperature upon coalescence.

31. A composition according to claim 30, wherein the self-crosslinking is via polymer-to-crosslinker reaction of the vinyl addition polymer with the crosslinker and polymer-to-crosslinker reaction of the polyurethane dispersion with the crosslinker.

* * * * *

UNITED STATES PATENT AND TRADEMARK OFFICE
CERTIFICATE OF CORRECTION

PATENT NO. : 7,829,631 B2
APPLICATION NO. : 10/530975
DATED : November 9, 2010
INVENTOR(S) : Shaobing Wu and Frank Bor-Her Chen Page 1 of 1

It is certified that error appears in the above-identified patent and that said Letters Patent is hereby corrected as shown below:

Column 7, Line 26: "for a acid" should read --for an acid--.

Column 8, Line 32: "diisocyaante" should read --diisocyanate--.

Column 20, Line 6, Claim 14: Delete "carbonyl".

Column 20, Lines 8-9, Claim 14: Delete "carbonyl".

Column 20, Line 64, Claim 21: Delete "carbonyl".

Signed and Sealed this
Fifteenth Day of February, 2011

David J. Kappos
*Director of the United States Patent and Trademark Office*